United States Patent [19]
Justus

[11] Patent Number: 5,226,662
[45] Date of Patent: Jul. 13, 1993

[54] EXPANDED GRAPHITE AND METAL CORE AUTOMOTIVE HEAD GASKET

[75] Inventor: Thomas J. Justus, Palatine, Ill.

[73] Assignee: Fel-Pro Incorporated, Skokie, Ill.

[21] Appl. No.: 909,613

[22] Filed: Jul. 7, 1992

[51] Int. Cl.$^5$ .............................. F16T 15/32
[52] U.S. Cl. .................... 277/235 B; 277/227; 277/235 R
[58] Field of Search ............... 277/227, 229, 231, 232, 277/233, 234, 235 B, 235 R, 235 A, 180

[56] References Cited
U.S. PATENT DOCUMENTS

| | | | |
|---|---|---|---|
| 1,783,762 | 1/1927 | Yarnall et al. | 277/231 |
| 1,985,473 | 12/1934 | Victor | 277/235 B |
| 4,465,287 | 8/1984 | Bindel et al. | 277/184 |
| 4,519,619 | 5/1985 | Doyle | 277/235 B |
| 4,756,537 | 7/1988 | Beyer et al. | 277/235 B |
| 4,852,893 | 8/1989 | Wesley | 277/235 B |
| 4,971,338 | 11/1990 | Udagawa | 277/235 B |

*Primary Examiner*—William A. Cuchlinski, Jr.
*Assistant Examiner*—Daniel G. DePumpo
*Attorney, Agent, or Firm*—Dressler, Goldsmith, Shore, Sutker & Milnamow, Ltd.

[57] ABSTRACT

A gasket having a metal core and a coextensive expanded graphite facing layer. The metal core provides a protective edge surrounding combustion openings. The edge is formed and curved downwardly to embrace the edge of the expanded graphite, but is not reentrant. The tip of the edge is spaced from the plane of the inner core surface by a distance equal to the thickness of the expanded graphite layer.

2 Claims, 1 Drawing Sheet

EXPANDED GRAPHITE AND METAL CORE AUTOMOTIVE HEAD GASKET

BACKGROUND OF THE INVENTION

A wide variety of gaskets having metallic cores and graphite facing layers exits. Because of the structural fragility of expanded graphite, typically graphite faced gaskets have employed a surrounding (reentrant) armor or an overlap in the zones of the combustion openings in head gaskets. That serves to prevent flakes and pieces of graphite from falling into the combustion chambers and protects the graphite layer or layers. Further, and again because of the fragility of expanded graphite and its lack of strength and resilience, when reentrant armors or overlaps are used to surround and embrace graphite surfaces at combustion openings, they tend to develop stress cracks, resulting in failures in the seal around the combustion opening, hence failure of the gasket.

Because expanded graphite facings are desirable for gasket use in a variety of environments such as in head gaskets, it would be desirable to provide a expanded graphite/metal gasket which is not subject to those failings and where, unlike the multipart special close tolerance structure of gaskets such as those shown in Bindel et al. U.S. Pat. No. 4,465,287, it may be fabricated easily from a graphite clad metal sheet without special parts or armors.

SUMMARY OF THE INVENTION

In accordance with the present invention an improved head gasket is provided. The gasket comprises an expansive metal layer extending across the entire breadth of the gasket and having upper and lower main surfaces and a generally coextensive expanded graphite facing layer adhered to one of the main surfaces. The gasket defines a plurality of openings, including at least one combustion opening. The metal layer defines a protective edge surrounding each combustion opening. Each protective edge is formed and curved downwardly to embrace and confront the adjacent edge of the expanded graphite layer. The protective edge is not reentrant and the edge tip of the protective edge is spaced away from the plane of the one main surface by a distance which is substantially equal to the thickness of the main body of the graphite layer.

In a preferred form the gasket is a head gasket and defines at least two combustion openings, with the plurality of openings further including a plurality of bolt holes and fluid flow openings. Desirably the metal layer defines embossments surrounding a plurality of the openings.

Further objects, features and advantages of the present invention will become apparent from the following description and drawings.

DETAILED DESCRIPTION

Figure 1:
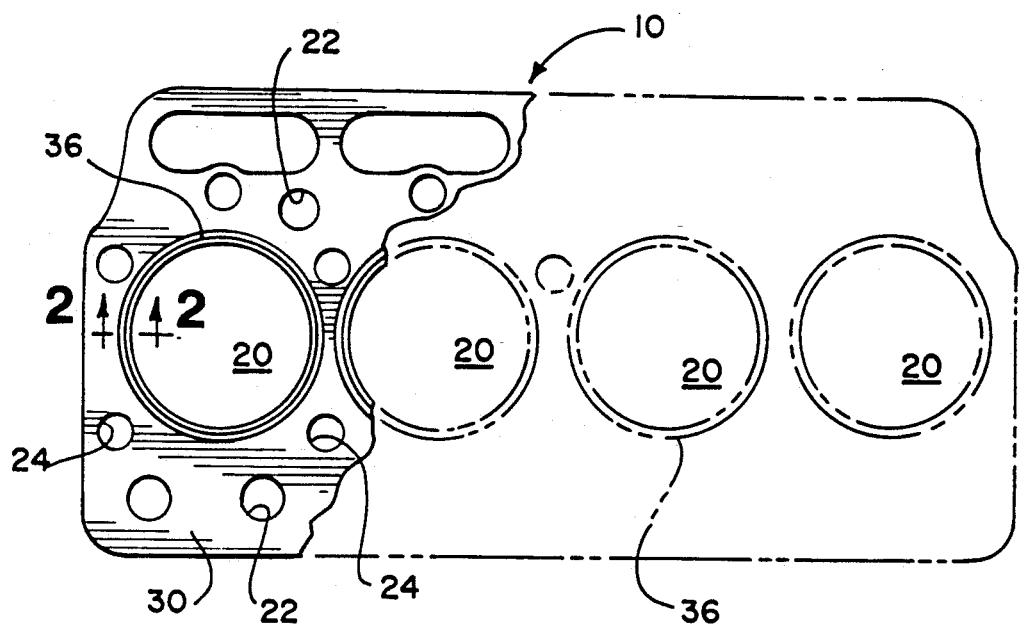
FIG. 1 is a plan view of a typical head gasket employing the principles of the present invention.

Referring now to the drawings, a head gasket 10 having a plurality of openings including combustion openings 20, a plurality of fluid openings 22 and a plurality of bolt holes 24 is there shown. Head gasket 10 comprises an expansive metal sheet 30 and a flexible, expanded graphite sheet 32 laminated thereto, as by a conventional adhesive A. The metal sheet extends across the entire breadth of the gasket.

The gasket 10 may employ a thin elastomeric rubber sealing coating 34 as of Viton, a fluoroelastomer rubber available from E.I. DuPont. Similar materials are available from 3M and others. This is not to the exclusion of other elastomers. Although the elastomeric materials used may be conventional rubber-like materials such as nitrile rubber and neoprene and the like, thermoplastic materials which have the characteristics of elastomers may be considered as elastomeric. Typical suitable thermoplastic elastomers are polyolefin based thermoplastics, polyurethane thermoplastics, and Kraton, D and G grades, a styrene based thermoplastic elastomer available from Shell Oil.

The metal layer which may preferably be of stainless steel, spring steel or carbon steel, and may range in thickness from about 0.006 to about 0.060 inch. The rubber coatings may range in thickness from about 0.0005 to about 0.0030 inch.

A suitable compressed flexible, expanded graphite material is available from Calcarbon, a division of Polycarbon, Inc. under the name Calgraph A. A typical Calgraph A comprises a minimum of about 98% graphite and about 2% ash maximum at 950° C. (ASTM C-561) and has a density of about 70 pounds per cubic foot. The material is essentially devoid of binders, resins, filler and additives. A like material is said by Union Carbide Corporation to be made in accordance with U.S. Pat. No. 3,404,061. Such materials may be formed into sheets, and then die-cut into the desired shape and then further compressed, if desired. Thus 70 pound per cubic foot sheet material may be cut into suitable gasket shapes for assembly with the core later to be further compressed, if desired, or expanded graphite may be formed into the sheet pattern described and then laminated with the core.

The gasket 10 may be provided with appropriate sealing aids and enhancements, such as embossments 36 positioned around selected openings and the thin sealing coating 34 of rubber referred to above. Other sealing aids and enhancements may be used consistent with current and known practices.

Figure 2:
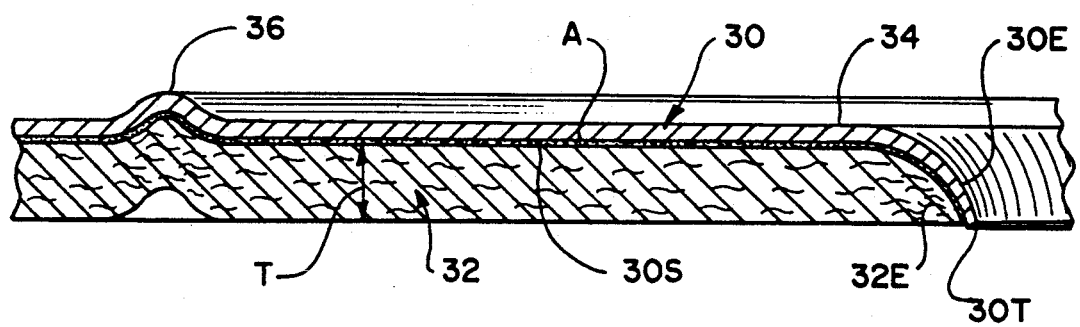
FIG. 2 is a cross-sectional view of the gasket of FIG. 1 taken substantially along line 2-2 of FIG. 1.

Of special importance in connection with the present invention is the treatment of the metal sheet 30 and its relationship to the expanded graphite sheet at the combustion openings 20. As will best be seen in FIG. 2, the edges 30E of the metal sheet 30 at the combustion openings 20 are formed and curved downwardly to embrace the confronting edges 32E of the graphite sheet 32. The curved protective edge 30E, which is convex when viewed from the center of the combustion opening 20, confronts, embraces and helps define the shape of the adjacent edge 32E of the graphite sheet. At that location the edge tip 30T of the curved edge 30E is spaced away from the plane of the generally planar main lower or inner surface 30S by a distance which is substantially equal to the thickness T of the main body of the expanded graphite sheet 32. Thus curved, non-reentrant edge 30E provides a formed protective edge for the expanded graphite in the zone where it surrounds the combustion opening thereby to prevent the graphite from falling into the combustion chamber and to provide protection for the adjacent surface and edge 32E of the expanded graphite layer 32.

Very importantly, the convex curved edge 30E which is not reentrant, i.e., which is open and which does not curve around the other main surface of the graphite sheet, does not stress-crack when subjected to ordinary loading as do typically used reentrant armors and overlaps. The non-reentrant convex curved edge 30E does not have a curvature in excess of 90°.

To fabricate a gasket of the present invention, the metal layer may be made from a flat sheet and may be provided with suitable embossments, such as embossments 36 which surround the combustion openings 20, as by blanking. The curved metal edges 30E and edge tips 30T are curved and formed downwardly during the blanking operation. Typically the edge tips 30T are burr edges.

The formed metal sheet may be precoated, as with a micro-rubber coating 34, or may be provided with other desired sealing aids, such as printed beads, other surface coatings or the like.

After the formed metal sheet is fabricated, an expanded graphite sheet may be applied and adhered thereto. Alternatively, the expanded graphite sheet may be applied and adhered to the metal sheet prior to forming or blanking.

It will be apparent to those skilled in the art that other and further embodiments and changes may be made in accordance with the present invention. Accordingly, the invention is not to be considered as being limited, except as may be necessitated in accordance with the claims.

What is claimed is:

1. A head gasket comprising an expansive metal layer extending across the entire breadth of the gasket and having generally planar upper and lower main surfaces, and a generally coextensive expanded graphite facing layer adhered to one of said main surfaces, said gasket defining a plurality of openings, including at least two combustion openings and a plurality of bolt holes and fluid flow openings, and wherein said metal layer defines a protective edge surrounding each said combustion opening, each protective edge being formed and gradually curved downwardly to embrace and confront the adjacent edge of said expanded graphite layer, and wherein said protective edge is not reentrant and the edge tip of said protective edge is spaced away from the plane of said one main surface by a distance which is substantially equal to the thickness of the main body of said graphite layer, and wherein the edge of said graphite facing layer is compressed from the thickness of the main body of the facing layer to a progressively reduced thickness defined by the curvature of the curved, non-reentrant protective edge.

2. A gasket in accordance with claims 1, and wherein said metal layer defines embossments surrounding a plurality of said openings.

* * * * *